United States Patent
Bar et al.

(10) Patent No.: US 8,438,241 B2
(45) Date of Patent: May 7, 2013

(54) DETECTING AND PROTECTING AGAINST WORM TRAFFIC ON A NETWORK

(75) Inventors: Anat Bremler Bar, Holon (IL); Dan Touitou, Ramat Gan, IL (US); Rami Rivlin, Tel Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 2040 days.

(21) Appl. No.: 10/774,169

(22) Filed: Feb. 5, 2004

(65) Prior Publication Data

US 2005/0021740 A1    Jan. 27, 2005

Related U.S. Application Data

(63) Continuation-in-part of application No. PCT/IL02/00996, filed on Dec. 10, 2002, which is a continuation-in-part of application No. 09/929,877, filed on Aug. 14, 2001.

(60) Provisional application No. 60/445,605, filed on Feb. 6, 2003.

(51) Int. Cl.
*G06F 15/16* (2006.01)

(52) U.S. Cl.
USPC ........... 709/218; 709/223; 709/224; 709/225; 713/152; 713/166

(58) Field of Classification Search .................. 709/223, 709/224, 238, 218, 225; 726/22, 23; 370/229; 713/152, 166, 155
See application file for complete search history.

(56) References Cited

U.S. PATENT DOCUMENTS

| | | | | |
|---|---|---|---|---|
| 5,889,943 A * | 3/1999 | Ji et al. | ............................ | 726/22 |
| 5,960,170 A * | 9/1999 | Chen et al. | ...................... | 714/38 |
| 6,279,113 B1 * | 8/2001 | Vaidya | ............................ | 726/23 |
| 6,321,338 B1 * | 11/2001 | Porras et al. | ..................... | 726/25 |
| 6,397,335 B1 | 5/2002 | Franczek et al. | | |
| 6,453,345 B2 * | 9/2002 | Trcka et al. | ................... | 709/224 |

(Continued)

FOREIGN PATENT DOCUMENTS

| | | |
|---|---|---|
| CN | 1728679 A | 2/2006 |
| WO | WO 02/25402 | 3/2002 |
| WO | WO 02/38870 | 5/2002 |
| WO | WO 03/050644 | 6/2003 |

OTHER PUBLICATIONS

Bennett, J.C.R. et al. "Hierarchical Packet Fair Queueing Algorithms", 1996.

(Continued)

*Primary Examiner* — Thuong Nguyen
*Assistant Examiner* — Thuong (Tina) T Nguyen
(74) *Attorney, Agent, or Firm* — Baker Botts L.L.P.

(57) ABSTRACT

A method for processing communication traffic includes monitoring the communication traffic that is directed to a group of addresses on a network, and determining respective baseline characteristics of the communication traffic that is directed to each of the addresses in the group. Deviations from the respective baseline characteristics of the communication traffic directed to at least one of the addresses in the group are detected, as an indication that at least some of the communication traffic may be of malicious origin. Responsively to detecting the deviation, the communication traffic that is directed to all of the addresses in the group is filtered so as to remove at least some of the communication traffic that is of the malicious origin.

18 Claims, 3 Drawing Sheets

U.S. PATENT DOCUMENTS

| | | | |
|---|---|---|---|
| 6,487,666 | B1 | 11/2002 | Shanklin et al. |
| 6,513,122 | B1 * | 1/2003 | Magdych et al. ............... 726/23 |
| 6,886,099 | B1 * | 4/2005 | Smithson et al. ............... 726/24 |
| 6,886,102 | B1 * | 4/2005 | Lyle ................................ 726/23 |
| 6,934,857 | B1 * | 8/2005 | Bartleson et al. ................. 726/5 |
| 7,007,302 | B1 * | 2/2006 | Jagger et al. ..................... 726/25 |
| 7,099,940 | B2 * | 8/2006 | Givoly ........................... 709/224 |
| 2001/0039579 | A1 * | 11/2001 | Trcka et al. .................... 709/224 |
| 2002/0023227 | A1 * | 2/2002 | Sheymov et al. .............. 713/201 |
| 2002/0083175 | A1 * | 6/2002 | Afek et al. .................... 709/225 |
| 2002/0107953 | A1 | 8/2002 | Ontiveros et al. |
| 2004/0093513 | A1 | 5/2004 | Cantrell et al. |
| 2008/0016167 | A1 | 1/2008 | Lund et al. |

OTHER PUBLICATIONS

Bennett, J.C.R. et al. "High Speed, Scalable, and Accurate Implementation of Fair Queueing Algorithms in ATM Networks", 1996.

Bennett, J.C.R. et al. "WF2Q: Worst-Case Fair Weighted Fair Queueing", 1996.

Chiussi, F.M. et al. "Implementing Fair Queueing in ATM Switches: The Discrete-Rate Approach", 1998.

Chiussi, F.M. et al. "Minimum-Delay Self-Clocked Fair Queueing Algorithm for Packet-Switched Networks", 1998.

Demers, A. et al. "Analysis and Simulation of a Fair Queueing Algorithm", 1989 Association for Computing Machinery.

Eckhardt, D.A. et al. "Effort-limited Fair (ELF) Scheduling for wireless Networks", IEEE INFOCOM 2000.

Golestani, S.J. "Networks Delay Analysis of a Class of fair Queueing. Algorithms", IEEE Journal on Selected Areas in Communications, vol. 13, No. 6, Aug. 1995, pp. 1057-1070.

Golestani, S.J. "A self-Clocked fair Queueing Scheme for Broadband Applications", IEEE 1994, pp. 5c.1.1-5c1.11.

Greenberg, Albert G. et al. "How Fair is Fair Queuing?" Journal of the Association for Computing Machinery vol. 39, No. 3, Jul. 1992, pp. 568-598.

Parekh, A.K.J. "A Generalized Processor Sharing Approach to Flow Control in Integrated Services Networks", Ph.D. Dissertation Massachusetts Institute of Technology, Feb. 1992.

Parekh, A.K.J. "A Generalized Processor Sharing Approach to Flow Control in Integrated Services Networks: The Single-Node Case", IEEE/ACM Transactions on Networking vol. 1, No. 3, Jun. 1993, pp. 344-357.

"Quality of Service Networking", downloaded from the web (address: http://www.cisco.com/univercd/cc/td/doc/cisintwk/ito_doc/qos.htm), Cisco Systems, Inc. 2002.

Rexford, J.L. et al. "Hardware Efficient Fair Queueing Architectures for high-Speed networks", IEEE, 1996, pp. 5d.2.1-5d.2.9.

Shreedhar M. et al. "Efficient Fair Queueing Using Deficit Round-Robin", IEEE/ACM Transactions on networking vol. 4, No. 3, Jun. 1996, pp. 375-385.

Stiliadis, D. et al. "Frame-Based Fair Queueing: A New Traffic Scheduling Algorithm for Packet-Switched Networks", Jul. 1995, pp. 1-43.

Sharad Agarwal, et al., "DDoS Mitigation via Regional Cleaning Centers", Sprint ATL Research Report RR04-ATL-013177, Jan. 2004.

A Supplementary European Search Report dated Dec. 9, 2010, which issued during the prosecution of Applicant's European Patent Application No. EP 04708430.

Anagnostakis K G et al., "Efficient packet monitoring for network management", Internet Citation, 2002, pp. 423-436.

Bakos G et al., "Early detection of Internet worm activity by metering ICMP destination unreachable messages", Proceedings of the International Society for Optical Engineering (SPIE), USA, vol. 4708, Jan. 1, 2002, pp. 33-42.

An Office Action dated Oct. 15, 2010, which issued during the prosecution of Applicant's U.S. Appl. No. 11/183,091.

A Supplementary European Search Report dated Dec. 9, 2010, which issued during the prosecution of Applicant's European Patent Application No. EP 04726605.

The Patent Office of the People's Republic of China, The Second Office Action dated Apr. 25, 2012 with regard to Application No. 200680054298.8, Serial 201204210055110.

The Patent Office of the People's Republic of China, The Third Office Action issued Sep. 29, 2012 with regard to Application No. 200680054298.8 (with English translation).

European Patent Office Action for Application No. 04 708 430.6-2413; 4 pages, Dec. 19, 2011.

* cited by examiner

DETECTING AND PROTECTING AGAINST WORM TRAFFIC ON A NETWORK

CROSS-REFERENCE TO RELATED APPLICATIONS

This application claims the benefit of U.S. Provisional Patent Application 60/445,605, filed Feb. 6, 2003. This application is a continuation-in-part of PCT Patent Application PCT/IL02/00996, filed Dec. 10, 2002, which is a continuation-in-part of U.S. patent application Ser. No. 09/929,877, filed Aug. 14, 2001. This application is also related to U.S. patent application Ser. No. 10/232,993, filed Aug. 29, 2002. All of these related applications are assigned to the assignee of the present patent application, and their disclosures are incorporated herein by reference.

FIELD OF THE INVENTION

The present invention relates generally to computer networks, and specifically to methods and systems for protecting against malicious traffic in computer networks.

BACKGROUND OF THE INVENTION

"Worms" are malicious programs that self-replicate across networks, typically by exploiting security flaws in widely-used services. The term "malicious," as used in the context of the present patent application and in the claims, refers to programs and network communication traffic that are initiated by a computer user (or users) in order to disrupt the orderly operation of other computers and network elements. A computer on which a worm program is running is referred to as "infected," and this term is also used to refer to the malicious traffic that the computer generates under the control of the worm.

Worm infections are often invisible to the user of an infected computer, and the worm may copy itself to other computers independently of any action taken by the computer user. After infecting a computer, the worm program typically begin scanning the network for other computers to infect. To enable this scanning, for example, the worm may cause the infected computer to attempt to reach other computers by sending out a large volume of Transmission Control Protocol (TCP) SYN request packets to random Internet Protocol (IP) destination addresses, in the hope of establishing a connection with other computers and infecting them. Each of these destination addresses may send back a SYN-ACK response packet (or a RST packet to indicate a refusal to establish a connection). Worm-generated scanning may thus generate a large volume of both incoming and outgoing message traffic, which can consume the victim's available bandwidth and other critical system resources. Consequently, servers and networks infected by a worm often experience performance degradations.

Recent well-known worms include Code Red, Nimba and Slammer/SQL. For example, Code Red I spread during the summer of 2001 by exploiting a security flaw in Microsoft® IIS Web servers. Once it infected a server, the worm spread by launching multiple threads, each of which generated random IP addresses and attempted to compromise servers at these addresses. In addition to this self-replication, Code Red I self-activated simultaneously on infected servers to launch a coordinated Denial of Service (DoS) attack on the www-.whitehouse.gov domain.

SUMMARY OF THE INVENTION

In embodiments of the present invention, a network guard device detects and blocks incoming and/or outgoing packets generated by a malicious source, such as a worm. Typically, the guard device detects worm attacks by identifying anomalous traffic patterns that resemble known patterns associated with worm-generated traffic. Once the guard device detects a suspicious traffic pattern, it may take protective action, aimed at blocking the spread of the infection and reducing the burden on other network resources due to worm-generated traffic.

Typically, any given computer within a network will have a consistent, characteristic traffic pattern, i.e., it will communicate with other computers using certain protocols and destination ports, at a certain regular set of network addresses. Thus, for example, a Web server will receive many incoming SYN request packets on TCP port 80, while a database server will receive Structured Query Language (SQL) queries on User Datagram Protocol (UDP) port 1434. On the other hand, a client computer should typically receive very few, if any, TCP SYN requests or packets addressed to UDP port 1434. Worm scanning, however, may generate a substantial amount of this sort of anomalous traffic.

Thus, in some embodiments of the present invention, the guard device monitors characteristics of incoming traffic that is directed to a selected group of network addresses within an area of the network that is protected by the guard device—or to all of the network addresses in the protected area. For example, the guard device may choose to monitor a set of IP addresses belonging to clients that receive relatively little incoming traffic. The guard device learns characteristics of the normal pattern of traffic that is directed to each of IP addresses in the monitored set, such as the maximum rate of incoming packets, the distribution of source IP addresses, the protocols and ports that are used, and other parameters. The guard device then detects deviations from this normal pattern, typically by counting the number of anomalous packets that are directed to each of the monitored addresses during a given period of time (for example, one minute). When the count exceeds a predetermined threshold criterion, the guard device determines that a worm attack may have begun, and initiates protective action.

In some embodiments of the present invention, as noted above, the guard device also detects traffic patterns that may indicate that one (or more) of the computers within the protected area has been infected by a worm. When such an infection is detected, the guard device traces back through the switches (such as routers and bridges) within the protected area in order to find the source of the worm-generated traffic. The guard device then notifies the system administrator of the infection, and may meanwhile instruct the switch closest to the source to block the port serving the infected computer until the system administrator has taken the computer off-line and cleaned the infection.

Although the embodiments described in the present patent application are directed mainly to detecting and blocking worm-related traffic, the principles of the present invention may similarly be applied in protecting against other types of malicious network traffic. The techniques that are described herein may be used on their own or in combination with other, complementary techniques for detecting and protecting against malicious traffic. Such techniques are described, for example, in the above-mentioned U.S. and PCT patent applications.

There is therefore provided, in accordance with an embodiment of the present invention, a method for processing communication traffic, including:

monitoring the communication traffic that is directed to a group of addresses on a network;

determining respective baseline characteristics of the communication traffic that is directed to each of the addresses in the group;

detecting a deviation from the respective baseline characteristics of the communication traffic directed to at least one of the addresses in the group, such that the deviation is indicative that at least some of the communication traffic may be of malicious origin; and responsively to detecting the deviation, filtering the communication traffic that is directed to all of the addresses in the group so as to remove at least some of the communication traffic that is of the malicious origin.

Typically, monitoring the communication traffic includes selecting a subset of the group of the addresses to monitor responsively to the baseline characteristics. In a disclosed embodiment, determining the respective baseline characteristics includes determining respective amounts of the communication traffic that are directed to the addresses in the group, and selecting the subset includes selecting the addresses in the subset such that the addresses in the subset receive relatively small amounts of the communication traffic by comparison with other addresses in the group.

Typically, the baseline characteristics include one or more of a distribution of communication protocols used in generating the communication traffic, a distribution of ports to which the communication traffic is directed, a distribution of source addresses of the communication traffic, and a distribution of sizes of data packets sent to the addresses in the group.

In a disclosed embodiment, the baseline characteristics are indicative of a distribution of operating systems running on computers that have transmitted the communication traffic. For this purpose, detecting the deviation includes reading a Time-To-Live (TTL) field in headers of data packets sent to the addresses in the group, and detecting a change in the distribution of the values of the TTL field relative to the baseline characteristics.

Additionally or alternatively, detecting the deviation includes detecting events that are indicative of a failure in communication between a first computer at one of the addresses in the group and a second computer at another location in the network. For example, detecting the events may include detecting failures to establish a Transmission Control Protocol (TCP) connection.

In some embodiments, the method includes receiving packets that are indicative of a communication failure in the network that is characteristic of a worm infection, and filtering the communication traffic includes deciding to filter the communication traffic responsively to receiving the packets. In one of these embodiments, receiving the packets includes receiving Internet Control Message Protocol (ICMP) unreachable packets.

In a disclosed embodiment, monitoring the communication traffic includes making a determination that one or more packets transmitted over the network are ill-formed, and filtering the communication traffic includes deciding to filter the communication traffic responsively to the ill-formed packets.

In some embodiments, detecting the deviation includes incrementing a count of events that are indicative of the malicious origin of the communication traffic, and deciding whether to filter the communication traffic responsively to the count. Typically, detecting the deviation includes receiving data packets of potentially malicious origin, each data packet having a respective source address and destination address, and incrementing the count includes determining an amount by which to increment the count responsively to each of the data packets responsively to whether a previous one of the data packets had at least one of the same respective source address and the same respective destination address. In one embodiment, determining the amount by which to increment the count includes incrementing the count only if none of the data packets received previously had at least one of the same respective source address and the same respective destination address.

In some embodiments, detecting the deviation includes detecting a type of the communication traffic that appears to be of the malicious origin, and filtering the communication traffic includes intercepting the communication traffic of the detected type. Typically, detecting the type includes determining at least one of a communication protocol and a port that is characteristic of the communication traffic. Additionally or alternatively, detecting the type includes determining one or more source addresses of the communication traffic that appears to be of the malicious origin, and intercepting the communication traffic sent from the one or more source addresses.

Further additionally or alternatively, detecting the deviation includes detecting a type of the communication traffic that appears to be of the malicious origin, and monitoring the communication traffic includes collecting specific information relating to the traffic of the detected type. Typically, collecting the specific information includes determining one or more source addresses of the traffic of the detected type.

Monitoring and filtering the communication traffic typically includes monitoring and filtering the communication traffic that is transmitted into a protected area of the network containing the group of the addresses so as to exclude the communication traffic from the area. Additionally or alternatively, the method includes monitoring the communication traffic that is transmitted by computers in the protected area so as to detect an infection of one or more of the computers by a malicious program.

There is also provided, in accordance with an embodiment of the present invention, a method for processing communication traffic, including:

monitoring the communication traffic originating from a group of addresses and passing through a selected node on a network;

detecting a pattern in the traffic originating from at least one of the addresses that is indicative of a malicious program running on a computer at the at least one of the addresses; and tracing a route of the traffic from the selected node back to the at least one of the addresses so as to identify a location of the computer on which the malicious program is running.

Typically, tracing the route includes identifying a port of a switch on the network to which the computer is connected, and including disabling the identified port.

Detecting the pattern typically includes determining that the computer has transmitted packets to a large number of different destination addresses. Additionally or alternatively, detecting the pattern includes detecting a large number of packets transmitted by the computer to a specified port.

There is additionally provided, in accordance with an embodiment of the present invention, a method for processing communication traffic, including:

monitoring the communication traffic on a network so as to detect packets that are indicative of a communication failure in the network that is characteristic of a worm infection;

detecting an increase in a rate of arrival of the packets that are indicative of the communication failure; and responsively to the increase, filtering the communication traffic so as to remove at least some of the communication traffic that is generated by the worm infection.

In a disclosed embodiment, monitoring the communication traffic includes detecting Internet Control Message Protocol (ICMP) unreachable packets. Additionally or alternatively, monitoring the communication traffic includes detecting failures to establish a Transmission Control Protocol (TCP) connection.

There is further provided, in accordance with an embodiment of the present invention, a method for processing communication traffic, including:

monitoring the communication traffic on a network so as to detect ill-formed packets;

making a determination, responsively to the ill-formed packets, that at least some of the communication traffic has been generated by a worm infection; and responsively to the determination, filtering the communication traffic so as to remove the at least some of the communication traffic that is generated by the worm infection.

Typically, the packets include a header specifying a communication protocol, and monitoring the communication traffic includes determining that the packets contain data that are incompatible with the specified communication protocol. Additionally or alternatively, the packets include a header specifying a packet length, and monitoring the communication traffic includes determining that the packets contain an amount of data that is incompatible with the specified packet length.

There is moreover provided, in accordance with an embodiment of the present invention, apparatus for processing communication traffic, including a guard device, which is adapted to monitor the communication traffic that is directed to a group of addresses on a network, to determine respective baseline characteristics of the communication traffic that is directed to each of the addresses in the group, to detect a deviation from the respective baseline characteristics of the communication traffic directed to at least one of the addresses in the group, such that the deviation is indicative that at least some of the communication traffic may be of malicious origin, and responsively to detecting the deviation, to filter the communication traffic that is directed to all of the addresses in the group so as to remove at least some of the communication traffic that is of the malicious origin.

There is furthermore provided, in accordance with an embodiment of the present invention, apparatus for processing communication traffic, including a guard device, which is adapted to monitor the communication traffic on a network so as to detect packets that are indicative of a communication failure in the network that is characteristic of a worm infection, to detect an increase in a rate of arrival of the packets that are indicative of the communication failure, and responsively to the increase, to filter the communication traffic so as to remove at least some of the communication traffic that is generated by the worm infection.

There is also provided, in accordance with an embodiment of the present invention, apparatus for processing communication traffic, including a guard device, which is adapted to monitor the communication traffic on a network so as to detect ill-formed packets, to make a determination, responsively to the ill-formed packets, that at least some of the communication traffic has been generated by a worm infection, and responsively to the determination, to filter the communication traffic so as to remove the at least some of the communication traffic that is generated by the worm infection.

There is additionally provided, in accordance with an embodiment of the present invention, apparatus for processing communication traffic, including a guard device, which is adapted to monitor the communication traffic originating from a group of addresses and passing through a selected node on a network, to detect a pattern in the traffic originating from at least one of the addresses that is indicative of a malicious program running on a computer at the at least one of the addresses, and to trace a route of the traffic from the selected node back to the at least one of the addresses so as to identify a location of the computer on which the malicious program is running.

There is further provided, in accordance with an embodiment of the present invention, a computer software product, including a computer-readable medium in which program instructions are stored, which instructions, when read by a computer, cause the computer to monitor communication traffic that is directed to a group of addresses on a network, to determine respective baseline characteristics of the communication traffic that is directed to each of the addresses in the group, to detect a deviation from the respective baseline characteristics of the communication traffic directed to at least one of the addresses in the group, such that the deviation is indicative that at least some of the communication traffic may be of malicious origin, and responsively to detecting the deviation, to filter the communication traffic that is directed to all of the addresses in the group so as to remove at least some of the communication traffic that is of the malicious origin.

There is moreover provided, in accordance with an embodiment of the present invention, a computer software product, including a computer-readable medium in which program instructions are stored, which instructions, when read by a computer, cause the computer to monitor the communication traffic originating from a group of addresses and passing through a selected node on a network, to detect a pattern in the traffic originating from at least one of the addresses that is indicative of a malicious program running on a computer at the at least one of the addresses, and to trace a route of the traffic from the selected node back to the at least one of the addresses so as to identify a location of the computer on which the malicious program is running.

There is furthermore provided, in accordance with an embodiment of the present invention, a computer software product, including a computer-readable medium in which program instructions are stored, which instructions, when read by a computer, cause the computer to monitor the communication traffic on a network so as to detect packets that are indicative of a communication failure in the network that is characteristic of a worm infection, to detect an increase in a rate of arrival of the packets that are indicative of the communication failure, and responsively to the increase, to filter the communication traffic so as to remove at least some of the communication traffic that is generated by the worm infection.

There is also provided, in accordance with an embodiment of the present invention, a computer software product, including a computer-readable medium in which program instructions are stored, which instructions, when read by a computer, cause the computer to monitor the communication traffic on a network so as to detect ill-formed packets, to make a determination, responsively to the ill-formed packets, that at least some of the communication traffic has been generated by a worm infection, and responsively to the determination, to filter the communication traffic so as to remove the at least some of the communication traffic that is generated by the worm infection.

The present invention will be more fully understood from the following detailed description of the embodiments thereof, taken together with the drawings in which:

DETAILED DESCRIPTION OF EMBODIMENTS

Figure 1:
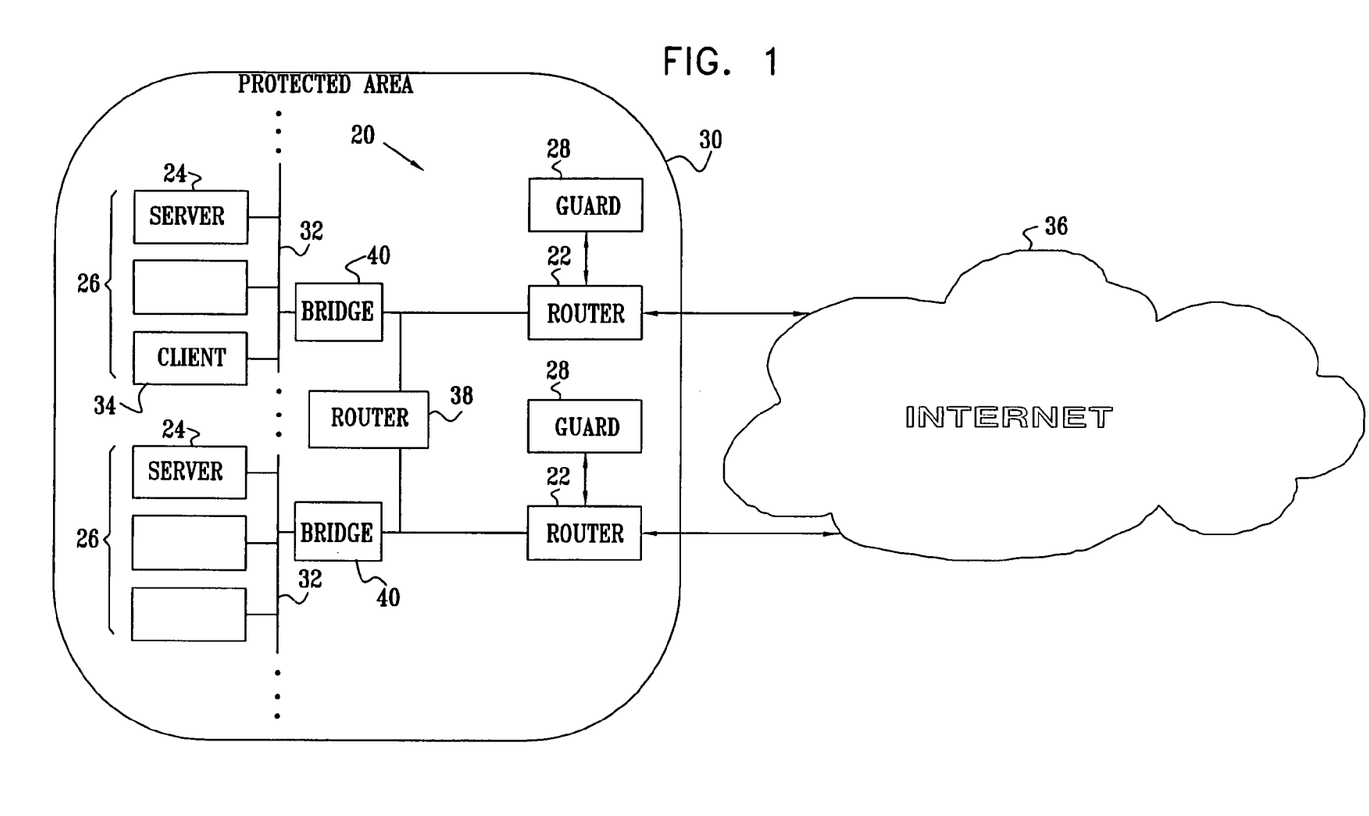
FIG. 1 is a block diagram that schematically illustrates a computer network protected by a guard system, in accordance with an embodiment of the present invention.

FIG. 1 is a block diagram that schematically illustrates a network guard system 20, in accordance with an embodiment of the present invention. A protected area 30 of a network communicates with a wide-area network (WAN) 36, typically the Internet, through one or more routers 22. Thus, area 30 typically comprises a certain subnet of the Internet. Protected area 30 comprises various network elements 26, such as servers 24, client computers 34 and switches, including internal routers 38 and bridges 40, which are typically interconnected by one or more local-area networks (LANs) 32. Typically, although not necessarily, protected area 30 comprises a private network, such as an enterprise or campus network, or a network operated by an Internet Service Provider (ISP).

Guard system 20 comprises one or more guard devices 28. To prevent worm infections of computers, such as servers 24 and clients 34, each guard device monitors incoming packets from WAN 36 that are addressed to network elements 26 in area 30. Guard device 28 analyzes these incoming packets in order to detect traffic patterns that may be indicative of a worm attack, as described hereinbelow. Once a suspicious traffic pattern has been detected, guard device 28 intercepts all or a portion of the packets entering (and possibly exiting) protected area 30, and filters the traffic in order to block worm-generated packets. Non-infected packets are forwarded to their intended destinations.

Alternatively or additionally, guard device 28 monitors outgoing packets sent from servers 24 and/or clients 34 to network elements outside protected area 30. By detecting and blocking worm-generated outgoing packets, guard device 28 prevents infected computers in area 30 from establishing connections with other computers outside the protected area. Blocking such infected traffic also relieves pressure on the links between routers 22 and WAN 36, so that legitimate traffic is not impeded by malicious activity.

Typically, guard device 28 comprises a general-purpose computer, which is programmed in software to carry out the functions described herein. The software may be downloaded to the computer in electronic form, over a network, for example, or it may alternatively be supplied to the computer on tangible media, such as CD-ROM or DVD. Further alternatively, guard device 28 may be implemented in dedicated hardware logic, or using a combination of hardware and software elements. Preferably, the guard devices have sufficient processing capacity so that they do not themselves become a bottleneck in the case of a worm attack.

In practical applications, guard system may be used to protect a cluster of servers 24, or it may be used to protect an entire LAN, intranet or a collection of servers and clients whose traffic is diverted to the guard devices. The guard functionality may be distributed among multiple guard devices 28, at one or more access points to protected area 30. Furthermore, the monitoring and filtering functions of guard system 20 may be carried out by physically separate units, rather than having an integrated guard device 28 carry out both of these functions. In applications using more than one guard device, the guard devices may share one or more common data repositories, or may otherwise communicate with each other, such as for performing aggregated statistical analyses and/or maintaining a common record of suspected sources of malicious packets. Although the embodiments described below refer to the functions of a single, integrated guard device, the techniques used by the guard device may similarly be implemented in a distributed guard system, as will be apparent to those skilled in the art.

Each guard device 28 may be a standalone unit, or it may alternatively be integrated with other communication or computing equipment, such as router 22, a firewall, or an intrusion detection system (not shown). The elements of guard system 20 may be deployed in configurations similar to firewalls known in the art. In the embodiments shown and described in the present patent application, guard devices 28 are associated with routers 22. These routers typically comprise standard IP routers, as are known in the art, but they may alternatively comprise Layer 3 switches of other types, and may operate in accordance with other network protocols. Typically, each guard device is connected in a "lollipop" fashion to one or more of the ports of a corresponding router. Alternatively, there need not be a one-to-one correspondence between guard devices and routers, and traffic between guard devices and routers may pass through other switches or other network nodes. Further details of the deployment of guard devices 28 and alternative deployment configurations are described in the above-mentioned U.S. and PCT patent applications.

Figure 2:
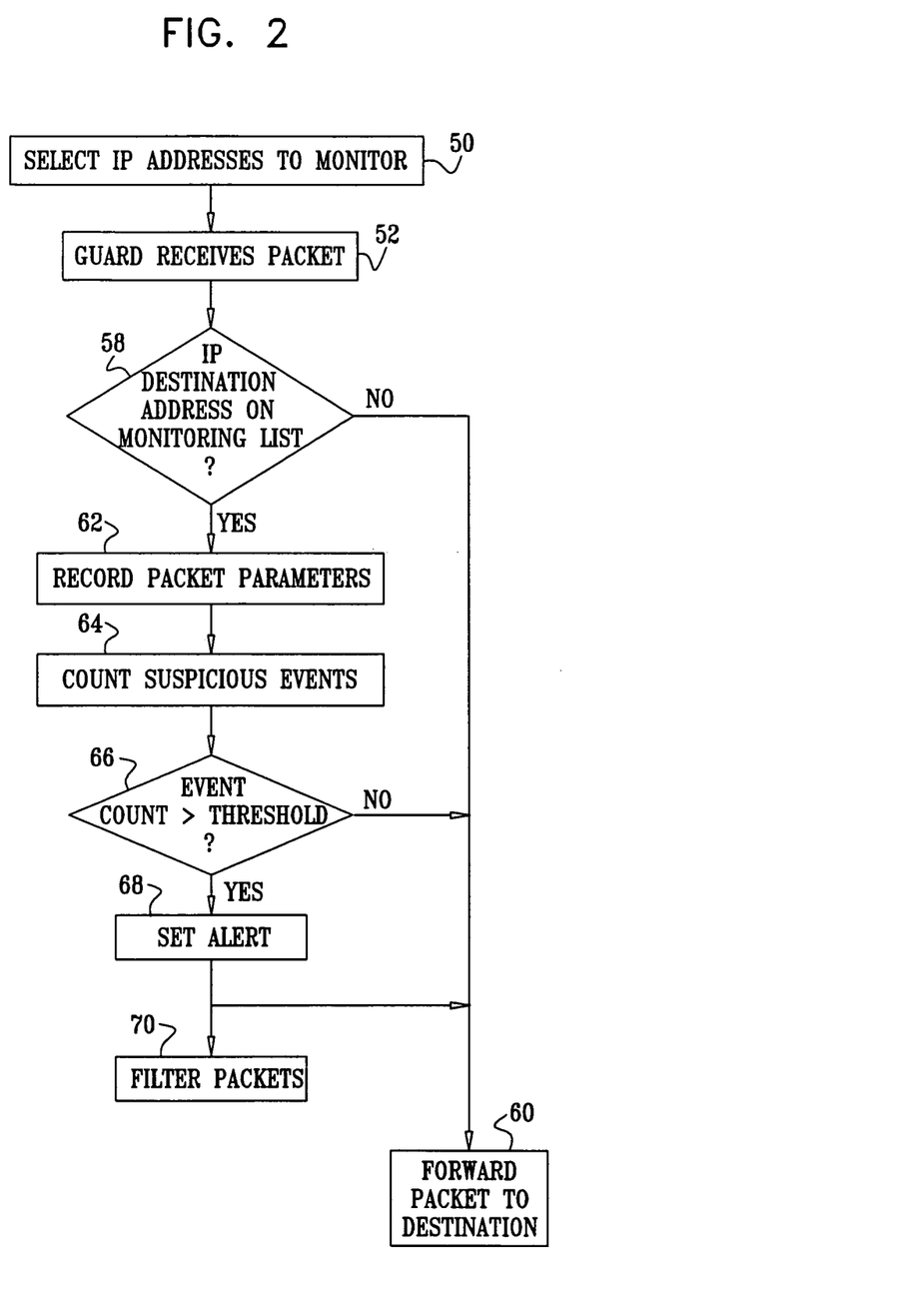
FIG. 2 is a flow chart that schematically illustrates a method for detecting worm-generated traffic, in accordance with an embodiment of the present invention.

FIG. 2 is a flow chart that schematically illustrates a method for detecting worm-generated traffic that is transmitted into protected area 30, in accordance with an embodiment of the present invention. The method is based on selecting a target group of the IP addresses in area 30 for guard devices 28 to monitor, at a target group selection step 50. If the guard devices have sufficient resources, in terms of memory and processing power, the monitored group may include all of the addresses routed to area 30, including unallocated IP addresses.

Alternatively, a subset of the addresses may be selected at step 50. Typically, the selected subset comprises the IP addresses in area 30 that are found to receive the least traffic from WAN 36. For example, the subset in this case might comprise clients 34, while excluding servers 24 that generally receive requests, queries or large amounts of data from other computers outside area 30. This low-activity subset may be selected and modified by guard device 28 on the fly, based on baseline measurements of the average level of incoming traffic over a period of time.

Alternatively or additionally, the group of addresses to be monitored may be set by a system administrator. This group may also include unassigned "trap" addresses, as described in the above-mentioned PCT patent application. Since the trap addresses are not used by any actual computers in area 30, incoming traffic destined for any of these trap addresses is anomalous, and is likely to indicate malicious scanning of IP addresses by a computer on WAN 36.

Guard device 28 receives a copy of the traffic passing through the associated router 22, at a traffic monitoring step 52. The guard device may copy the traffic at the physical level, by means of an optical or copper splitter, for example. Alternatively, the router may relay a copy of the incoming traffic on its input port to the guard device. Other alternative methods for copying traffic to the guard device will be apparent to those skilled in the art.

Guard device 28 checks the IP destination address of each incoming packet, at a destination checking step 58. If the destination address is not on the monitoring list established at step 50, the guard device typically ignores the packet, and router 22 simply forwards the packet on to its destination, at a packet passing step 60. On the other hand, if the destination address is included in the list, guard device 28 reads and records selected packet parameters, at a packet recording step 62. (As noted above, the monitoring list may include all of the IP addresses in area 30 or alternatively the IP addresses routed to area 30.) Alternatively, guard device 28 may read and assemble complete monitoring data (as described below) regarding packets sent to IP addresses on the monitoring list, while recording a more limited data set regarding the remaining addresses in area 30. For example, the guard device may record the number of incoming packets addressed to each of the IP addresses in area 30 in order to measuring the total level of activity of each of network elements 26 in the area. The guard device may then use this activity level information in order to identify low-activity elements to be included in the target group for monitoring.

Additionally or alternatively, other criteria may be applied in choosing the packets to be analyzed by guard device 28. For example, the guard device may monitor "ICMP unreachable" packets. These packets are generated by routers in accordance with the Internet Control Message Protocol (ICMP) when they receive a packet whose destination address does not appear on their routing lists. Thus, worm-generated scanning packets, which are sent out to random IP destination addresses, tend to engender a large number of these ICMP unreachable packets. Each ICMP unreachable packet contains information about the original packet that caused the ICMP unreachable packet to be generated. Therefore, an increase in the rate of arrival of the ICMP unreachable packets detected by guard device 28 may be indicative of a worm attack. The guard device may also be able to analyze the ICMP unreachable packets in order to determine the source of the attack, such as a particular subnet from which the scanning packets originated, assuming the source IP address is not spoofed.

Further additionally or alternatively, guard device 28 may apply other monitoring and detection criteria to some or all of the packets received by the corresponding router. For instance, guard device 28 may monitor packet contents to verify that the packets are "well formed," i.e., that the packet contents obey the rules of the applicable protocols. Appearance of significant numbers of ill-formed packets can indicate that a worm attack is in progress. Examples of criteria that may be applied in this regard include:

Testing whether the actual number of bytes in the packet is compatible with the number indicated by the packet length field in the packet header. Anomalous packet length is a characteristic sign of some types of worms.

Testing whether the contents of the packet payload are compatible with the type of traffic specified by the packet header. For instance, if the header indicates that a particular TCP/IP packet contains a Hypertext Transfer Protocol (HTTP) message, the payload may legally contain only ASCII characters. If the payload contains non-ASCII binary data, the packet may be infected.

These detection criteria may also be used to filter out and block infected packets when it is determined that an attack is in progress. Other suitable packet filtering criteria, which may also be applied in the attack detection stage, are described in the above-mentioned U.S. and PCT patent applications.

Returning now to FIG. 2, at recording step 62, guard device 28 records, for each destination address in the target set, the protocol and port of each incoming packet. In this manner, the guard device may maintain a table, for each address or group of addresses in the target set, in which it records the number of packets received on TCP port 80, 8000, 8080, etc., and similarly on various UDP ports and ports that are used by other protocols. The distribution of source addresses sending traffic to each of the destination may also be recorded. The figures collected in the table are gathered during periods of time in which there is no worm attack in progress, and thus provide a statistical baseline of the incoming traffic distribution for each destination address and for the target set as a whole.

Other packet parameters may also be recorded at step 62. For example, the value of the Time-To-Live (TTL) field in the IP header of each packet may be recorded in order to generate a TTL histogram. When a computer sends a packet, it set the TTL value initially to a certain starting value, and this value is decremented at each hop along the route of the packet. The initial TTL value is determined by the operating system of the sending computer, and different operating systems may initialize the TTL field in IP packets they create to different values. The standard initial value is 256, but other initial values that are known to exist are 128 (Windows®), 64 (Unix®), 60 and 30. A sudden change in the TTL histogram may thus indicate that a particular operating system has been infected by a worm, causing large numbers of computers to send infected packets with the TTL value characteristic of that operating system. Variations in other packet statistics, such as the distribution of the sizes of incoming packets, may also be indicative of an attack.

Guard device 28 examines the packet parameters to determine whether they constitute a suspicious event, at an event counting step 64. One type of suspicious event is receipt of a packet addressed to one of the monitored destination addresses wherein the packet type is out of line with the statistical baseline established for that destination address. For example, if a given monitored address belongs to one of clients 34, one would not expect that address to receive TCP SYN packets (port 80). Detection of such a packet by guard device 28 may indicate that an infected computer is scanning random IP addresses in an attempt to find servers to which it can spread the infection. Thus, guard device 28 counts packets of types that deviate, in terms of port, protocol, or other parameters, from the established baseline profile for any given destination address in the monitored group as suspicious events. (The same packet may be counted as an anomaly for two or more of the monitored parameters.) Typically, the guard device updates the baseline profile continually based on the incoming packets, so that legitimate, long-term changes in the profile are taken into account.

Another type of event that guard device 28 may count as suspicious is transmission of a packet that indicates a communication failure. For example, unsuccessful attempts to establish TCP connections may be regarded as suspicious events, particularly if the attempts are directed to many different destination addresses (indicating that a worm may be scanning IP addresses, as noted above). For this reason, guard device 28 may also receive and monitor outgoing TCP SYN, SYN-ACK or RST packets sent from addresses within protected area 30. When one of the computers in the protected area attempts to establish TCP connections with many different IP addresses, the guard device may identify the sending computer as potentially infected, and may take protective steps, as described further hereinbelow. Other sorts of abnormal transmission events (regarding both incoming and outgoing packets) may similarly be defined and monitored by guard device 28.

On the other hand, not all abnormal events are indicative of malicious traffic, and it is desirable that guard device 28 generate only a minimal number of false alarms. For example, if one of servers 24 in area 30 goes down, there may be many unsuccessful attempts by different clients on WAN 36 to establish TCP connections with the server or to receive responses to their HTTP or SQL queries. A method for avoiding false alarms due to this sort of event is described below with reference to FIG. 3.

After incrementing its count of suspicious events, guard device 28 checks its event count against an applicable threshold, at a threshold checking step 66. When the event count exceeds the threshold, the guard device determines that a worm attack may be in progress, at an alert step 68. The threshold may be fixed in advance, or it may be variable, depending on a combination of factors monitored by the guard device. For example, the decision to set the alarm may be based on a correlation of the suspicious event count with other factors, such as the number of ICMP packets or ill-formed packets detected by the guard device or variations in the TTL distribution, as mentioned above. The guard device may test the correlation using a weighted sum of different packet counts or using methods of artificial intelligence and machine learning, such as a decision tree or fuzzy logic.

Upon detecting a potential worm attack at step 68, guard device 28 typically notifies the system administrator responsible for the network in protected area 30. In addition, the guard device activates its packet filtering functions, at a filtering step 70. For this purpose, the guard device notifies routers 22 that certain packets (or possibly all packets) should be diverted to the guard device for cleaning before being passed on to their actual destination addresses. Methods that can be used for this sort of packet diversion are described in the above-mentioned patent applications and include, for example, using the Web Cache Coordination Protocol (WCCP) or Policy Based Routing (PBR), promulgated by Cisco® Systems (San Jose, Calif.). Filtering methods that may be applied by the guard device are likewise described in the above-mentioned patent applications. Note that many of the detection criteria described above may also be used, mutatis mutandis, in filtering potentially-infected packets.

Typically, for efficiency of processing, guard device 28 specifies at step 70 a certain set of source addresses and/or type of traffic for which routers 22 should divert traffic to the guard device. PBR, for instance, permits these criteria to be defined using access control lists (ACLs), which may specify destination port, type of packet (e.g., SYN request), or the interface on which the traffic was received. The guard device typically chooses the criteria based on the characteristics of the monitored traffic that led the guard device to conclude that an attack may be in progress. For example, if the alert was raised at step 68 due to an abnormally large number of incoming packets on TCP port 80, the guard device may instruct the router to divert only traffic on this port.

Additionally or alternatively, guard device 28 may set the diversion criteria dynamically, based on parameters of the abnormal traffic it has detected. For example, if the guard device detects an abnormal increase in traffic on a certain port, the guard device may then proceed to analyze the pattern of IP source addresses of the incoming traffic on this particular port. It may then choose to divert or block all traffic received from these suspect IP source addresses for a certain period of time, which may be for the duration of the attack. As another example, if the guard device detects an abnormal increase in incoming traffic on a certain port, it may instruct the router to divert outgoing traffic on the same or related ports to the guard device, as well. In this manner, the guard device may be able to detect and block packets transmitted by a computer in area 30 that has become infected.

Figure 3:
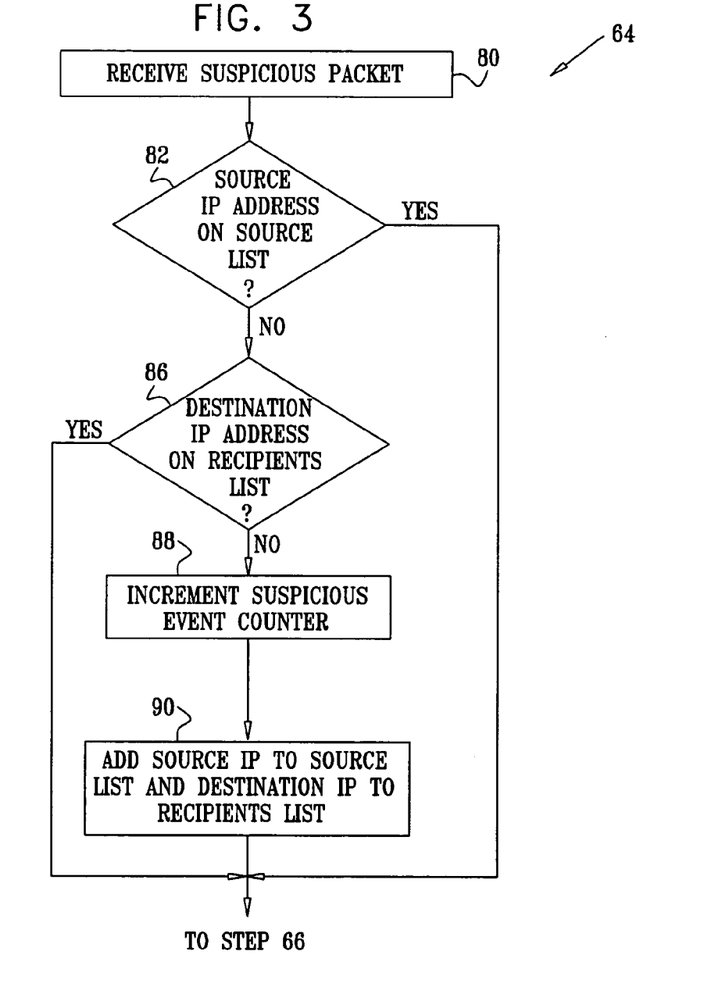
FIG. 3 is a flow chart that schematically illustrates a method for counting suspicious events that may arise from worm-generated traffic, in accordance with an embodiment of the present invention.

FIG. 3 is a flow chart that schematically shows details of event counting step 64, in accordance with an embodiment of the present invention. The method is typically applied to each destination port individually. Guard device 28 may apply this method in order to avoid generating false alarms due to abnormal events that can occur due to causes other than malicious attacks. For this purpose, guard device 28 maintain a source list S of source addresses, which have recently sent packets into protected area 30 with the given destination port number, and a recipient list D of the destination addresses of these packets.

Upon receiving a suspicious packet at step 80, the guard device checks the source address of the packet, at a source checking step 82. If the source address of the packet is not in S, the guard device checks the destination address of the packet, at a destination checking step 86. The guard device then increments its count of suspicious events, at a count incrementing step 88, only upon determining that the destination address is not in D. In other words, both the source address and the destination address of the suspicious packet must not have been previously recorded in order to cause the event counter to be incremented. The guard device then adds the destination address of the packet to D and the source address to S, at a recording step 90.

Thus, multiple suspicious packets from the same source or directed to the same destination cause the event counter to be incremented only once. Alternatively, the guard device may continue to count multiple packets with the same source or destination address, but with successively decreasing weights, so that the first packet for any source/destination pair is emphasized in the count relative to later packets with the same source or destination address.

Figure 4:
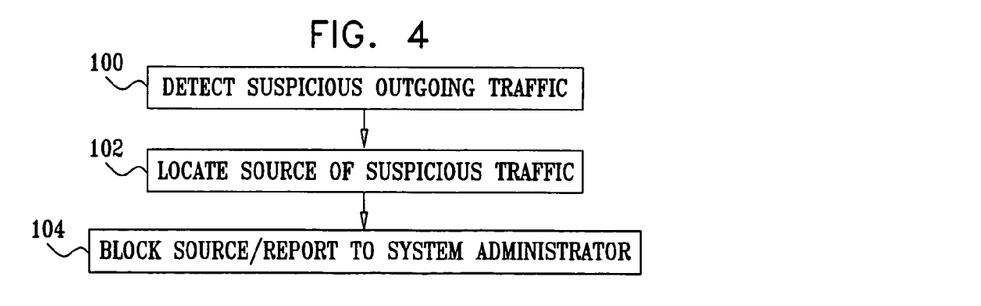
FIG. 4 is a flow chart that schematically illustrates a method for locating a worm-infected computer, in accordance with an embodiment of the present invention.

FIG. 4 is a flow chart that schematically illustrates a method for detecting an infected computer inside protected area 30, in accordance with an embodiment of the present invention. As noted earlier, although certain methods of packet monitoring and filtering are described above with reference mainly to preventing infected packets from entering area 30, similar methods may be applied in detecting infected packets sent from area to WAN 36, and in detecting the sources of these packets. Blocking these infected packets is helpful not only in arresting the spread of worms, but also in alleviating traffic bottlenecks that may occur on the links between routers 22 and WAN 36 due to transmission of large volumes of infected traffic. The above-mentioned PCT patent application describes this feature of guard device 28 in further detail.

The method of FIG. 4 is initiated when guard device 28 detects suspicious outgoing traffic on router 22, at a detection step 100. In addition to the detection parameters described above, the guard device may apply other criteria to identify outgoing traffic as suspicious, for example:

When a given source address in area 30 begins sending packets to many different destination addresses on WAN 36. (Based on the statistical baseline established earlier, guard device 28 can distinguish servers 24, which consistently send packets to many different destination addresses, from clients 34, which generally exhibit this sort of outgoing traffic pattern only when infected.)

When a given source address begins sending many packets on the same port (and typically to many different destination addresses), which is different from the baseline behavior of the source address.

When there is an increase in the total number or rate of outgoing packets on a given port (typically to many different destination addresses), even when the source addresses of the packets are different. Using UDP, for instance, it is possible for a worm to cause an infected computer to transmit packets with many different, false IP source addresses.

When there is an increase in the number of packets of certain specified types, such as packets generated by the Address Resolution Protocol (ARP). ARP request packets are generated by Ethernet switches in order to learn the Medium Access Control (MAC) address to use for a given IP destination address. Scanning of random IP addresses by an infected computer in area 30 will cause bridge 40 that is serving the particular computer to generate many ARP requests.

Additional and alternative criteria will be apparent to those skilled in the art.

Once guard device 28 detects a suspicious pattern of outgoing traffic, it attempts to locate the source of the traffic, at a source location step 102. Various methods are known in the art for locating the computer to which a given source IP address belongs. For example, guard device 28 may perform a reverse lookup of the IP source address using the Dynamic Host Configuration Protocol (DHCP), which is normally used by network administrators manage the assignment of IP addresses in a network. Alternatively or additionally, the guard device may use the "traceroute" utility, which is provided by many operating systems and TCP/IP packages, to record the route through the network in protected area 30 between router 22 and the source address of the suspicious packets. Even when the infected computer is using false IP addresses in the packets that it generates, MAC-level tracing may still be used to locate the actual source of the packets.

Guard device 28 uses these techniques to locate the chain of routers in area 30 leading back to the internal router 38 that is closest to the infected computer, and then to find the specific bridge 40 and the port of the bridge to which the infected computer is connected. The guard device may then instruct the bridge, using standard network management protocols, to disable the port serving the infected computer, at a source blocking step 104. The guard device reports the location of the infected computer to the system administrator of area 30, who can then take the necessary corrective action.

Although the embodiments described hereinabove are directed mainly to detecting and blocking worm-related traffic, the principles of the present invention may similarly be applied in protecting against other types of malicious network traffic. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for processing communication traffic, comprising:
    monitoring the communication traffic on a network so as to detect packets that are indicative of a communication failure in the network that is characteristic of a worm infection;
    detecting an increase in a rate of arrival of the packets that are indicative of the communication failure; and
    responsively to the increase, filtering the communication traffic so as to remove at least a portion of the communication traffic that is generated by the worm infection.

2. The method according to claim 1, wherein monitoring the communication traffic comprises detecting Internet Control Message Protocol (ICMP) unreachable packets.

3. The method according to claim 1, wherein monitoring the communication traffic comprises detecting failures to establish a Transmission Control Protocol (TCP) connection.

4. A method for processing communication traffic, comprising:
    monitoring the communication traffic on a network so as to detect ill-formed packets;
    making a determination, responsively to the ill-formed packets, that at least a portion of the communication traffic has been generated by a worm infection; and
    responsively to the determination, filtering the communication traffic so as to remove at least the portion of the communication traffic that is generated by the worm infection.

5. The method according to claim 4, wherein the packets comprise a header specifying a communication protocol, and wherein monitoring the communication traffic comprises determining that the packets contain data that are incompatible with the specified communication protocol.

6. The method according to claim 4, wherein the packets comprise a header specifying a packet length, and wherein monitoring the communication traffic comprises determining that the packets contain an amount of data that is incompatible with the specified packet length.

7. Apparatus for processing communication traffic, comprising a guard device, which is adapted to monitor the communication traffic on a network so as to detect packets that are indicative of a communication failure in the network that is characteristic of a worm infection, to detect an increase in a rate of arrival of the packets that are indicative of the communication failure, and responsively to the increase, to filter the communication traffic so as to remove at least a portion of the communication traffic that is generated by the worm infection.

8. The apparatus according to claim 7, wherein the guard device is adapted to detect Internet Control Message Protocol (ICMP) unreachable packets as an indication of the communication failure.

9. The apparatus according to claim 7, wherein the guard device is adapted to detect failures to establish a Transmission Control Protocol (TCP) connection.

10. Apparatus for processing communication traffic, comprising a guard device, which is adapted to monitor the communication traffic on a network so as to detect ill-formed packets, to make a determination, responsively to the ill-formed packets, that at least a portion of the communication traffic has been generated by a worm infection, and responsively to the determination, to filter the communication traffic so as to remove at least the portion of the communication traffic that is generated by the worm infection.

11. The apparatus according to claim 10, wherein the packets comprise a header specifying a communication protocol, and wherein the guard device is adapted to detect that the packets contain data that are incompatible with the specified communication protocol.

12. The apparatus according to claim 10, wherein the packets comprise a header specifying a packet length, and wherein the guard device is adapted to detect that the packets contain an amount of data that is incompatible with the specified packet length.

13. A computer software product, comprising a computer-readable medium in which program instructions are stored, which instructions, when read by a computer, cause the computer to monitor the communication traffic on a network so as to detect packets that are indicative of a communication failure in the network that is characteristic of a worm infection, to detect an increase in a rate of arrival of the packets that are indicative of the communication failure, and responsively to the increase, to filter the communication traffic so as to remove at least a portion of the communication traffic that is generated by the worm infection.

14. The product according to claim 13, wherein the instructions cause the computer to detect Internet Control Message Protocol (ICMP) unreachable packets as an indication of the communication failure.

15. The product according to claim 13, wherein the instructions cause the computer to detect failures to establish a Transmission Control Protocol (TCP) connection.

16. A computer software product, comprising a computer-readable medium in which program instructions are stored, which instructions, when read by a computer, cause the computer to monitor the communication traffic on a network so as to detect ill-formed packets, to make a determination, responsively to the ill-formed packets, that at least a portion of the communication traffic has been generated by a worm infection, and responsively to the determination, to filter the communication traffic so as to remove at least the portion of the communication traffic that is generated by the worm infection.

17. The product according to claim 16, wherein the packets comprise a header specifying a communication protocol, and wherein the instructions cause the computer to detect that the packets contain data that are incompatible with the specified communication protocol.

18. The product according to claim 16, wherein the packets comprise a header specifying a packet length, and wherein the instructions cause the computer to detect that the packets contain an amount of data that is incompatible with the specified packet length.

* * * * *